United States Patent
Nakamura et al.

(10) Patent No.: US 12,540,878 B2
(45) Date of Patent: Feb. 3, 2026

(54) CONNECTION LOSS DIFFERENCE MEASUREMENT METHOD, EQUIPMENT AND PROGRAM

(71) Applicant: NTT, Inc., Tokyo (JP)

(72) Inventors: Atsushi Nakamura, Musashino (JP); Tomokazu Oda, Musashino (JP); Yusuke Koshikiya, Musashino (JP)

(73) Assignee: NTT, Inc., Tokyo (JP)

( * ) Notice: Subject to any disclaimer, the term of this patent is extended or adjusted under 35 U.S.C. 154(b) by 63 days.

(21) Appl. No.: 18/689,785

(22) PCT Filed: Sep. 16, 2021

(86) PCT No.: PCT/JP2021/034051
§ 371 (c)(1),
(2) Date: Mar. 6, 2024

(87) PCT Pub. No.: WO2023/042326
PCT Pub. Date: Mar. 23, 2023

(65) Prior Publication Data
US 2024/0418601 A1 Dec. 19, 2024

(51) Int. Cl.
*G01M 11/00* (2006.01)

(52) U.S. Cl.
CPC .... *G01M 11/3145* (2013.01); *G01M 11/3154* (2013.01)

(58) Field of Classification Search
CPC ............. G01M 11/31; G01M 11/3109; G01M 11/3118; G01M 11/3127; G01M 11/3136;
(Continued)

(56) References Cited

U.S. PATENT DOCUMENTS 5,037,197 A * 8/1991 Bukhshtab ............. G01M 11/31
356/73.1
9,709,742 B2 * 7/2017 Amma ................. G02B 6/2555
(Continued)

FOREIGN PATENT DOCUMENTS

CN 111555803 B * 7/2021 ....... H04B 10/07955
JP 2022111486 A * 8/2022
(Continued)

OTHER PUBLICATIONS

M. Nakazawa et al., "Nondestructive measurement of mode couplings along a multi-core fiber using a synchronous multi-channel OTDR," Optics Express, vol. 20, No. 11, pp. 12530-12540, 2012.
(Continued)

*Primary Examiner* — Gordon J Stock, Jr.

(57) ABSTRACT

In order to achieve the above object, the present invention individually inputs light pulses to a first core and a second core at one end of a non-coupled multicore fiber having a connection portion, and individually acquires OTDR waveforms regarding the first core and the second core, calculates ratios between backscattering intensity regarding the first core and backscattering intensity regarding the second core, at at least two points including one point on one end side with respect to the connection portion and one point on another end side with respect to the connection portion, based on the acquired OTDR waveforms, and calculates a ratio between the calculated ratio on the one end side and the calculated ratio on the another end side.

6 Claims, 5 Drawing Sheets

(58) Field of Classification Search
CPC ......... G01M 11/3145; G01M 11/3154; G01M 11/3163; G01M 11/3172; G01M 11/3181; G01M 11/319; G02B 6/024042; H04B 10/071

See application file for complete search history.

(56) References Cited

U.S. PATENT DOCUMENTS

| | | | |
|---|---|---|---|
| 11,391,644 B2* | 7/2022 | Nakamura | G01M 11/3109 |
| 12,320,725 B2* | 6/2025 | Nakamura | G01M 11/332 |
| 2023/0288287 A1* | 9/2023 | Nakamura | G01M 11/3136 |
| 2023/0417630 A1* | 12/2023 | Ono | H04B 10/2581 |
| 2024/0264034 A1* | 8/2024 | Oda | G01M 11/02 |
| 2024/0344928 A1* | 10/2024 | Nakamura | G02B 6/02 |
| 2024/0426703 A1* | 12/2024 | Nakamura | G02B 6/02 |
| 2025/0110018 A1* | 4/2025 | Nakamura | G01M 11/3109 |

FOREIGN PATENT DOCUMENTS

| | | | |
|---|---|---|---|
| WO | WO-2014049666 A1 * | 4/2021 | G01M 11/3127 |
| WO | WO-2023157283 A1 * | 2/2023 | G01M 11/33 |
| WO | WO-2023069492 A1 * | 4/2023 | G01M 11/3136 |
| WO | WO-2024038487 A1 * | 2/2024 | G01M 11/02 |
| WO | WO-2024053224 A1 * | 3/2024 | G01M 11/02 |
| WO | WO-2024252658 A1 * | 12/2024 | G01M 11/02 |

OTHER PUBLICATIONS

M. Ohashi et al., "Longitudinal fiber parameter measurements of multi-core fiber using OTDR," Optics Express, vol. 22, No. 24, pp. 30137-30147, 2014.

* cited by examiner

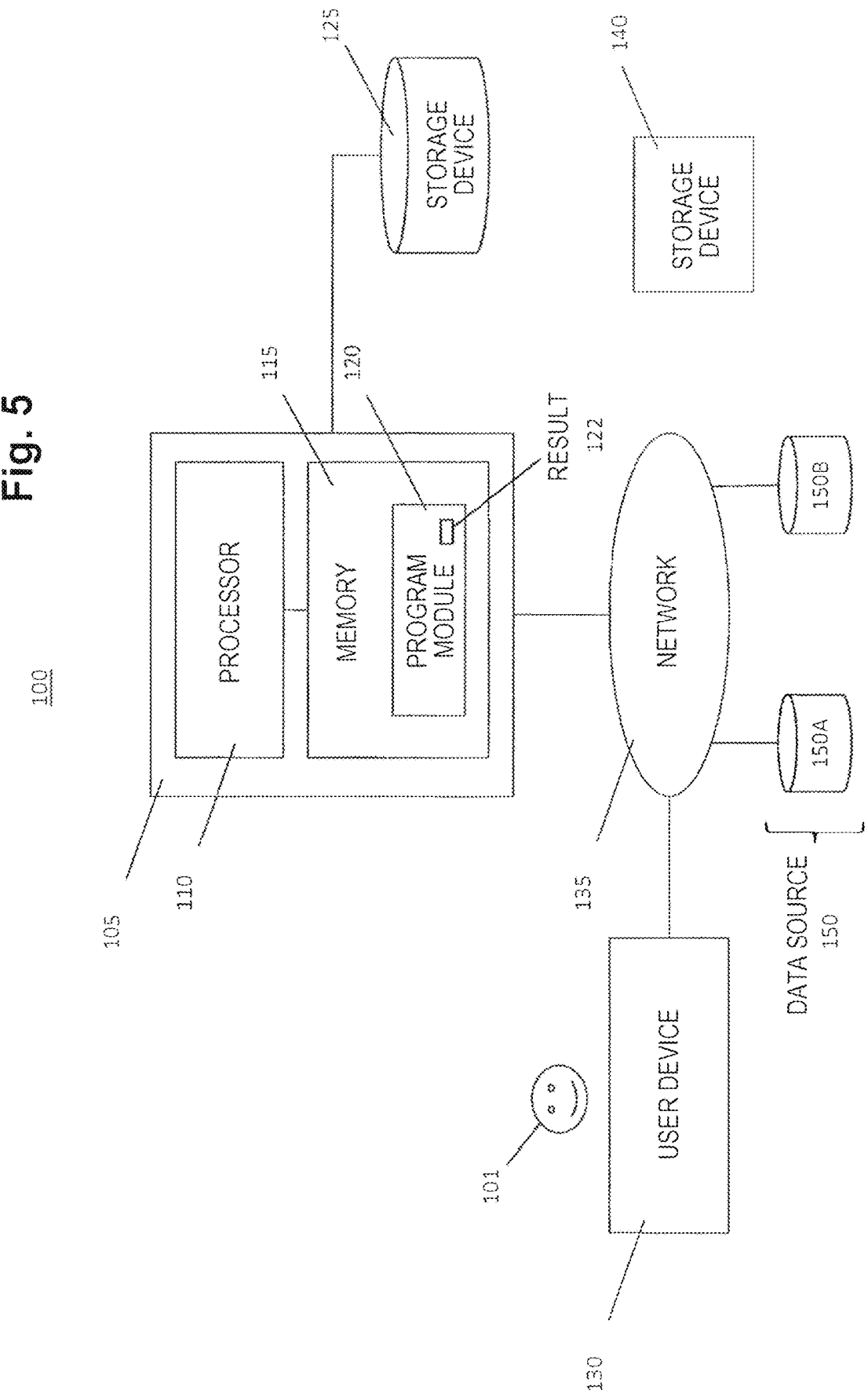

CONNECTION LOSS DIFFERENCE MEASUREMENT METHOD, EQUIPMENT AND PROGRAM

CROSS-REFERENCE TO RELATED APPLICATIONS

This application is a 371 U.S. National Phase of International Application No. PCT/JP2021/034051, filed on Sep. 16, 2021. The entire disclosure of the above application is incorporated herein by reference.

TECHNICAL FIELD

The present disclosure relates to a connection loss difference measuring method, device, and program for measuring a difference, between cores, in connection loss of a non-coupled multicore fiber having a connection portion.

BACKGROUND ART

A non-coupled multicore fiber is one of promising optical fibers as a medium for achieving future large-capacity optical communication.

In the non-coupled multicore fiber, transmission is performed using a plurality of cores as independent transmission paths, and thus crosstalk between the cores is an important characteristic.

CITATION LIST

Non Patent Literature

Non Patent Literature 1: M. Nakazawa et al., "Nondestructive measurement of mode couplings along a multi-core fiber using a synchronous multi-channel OTDR," Optics Express, vol. 20, no. 11, pp. 12530-12540, 2012.

Non Patent Literature 2: M. Ohashi et al., "Longitudinal fiber parameter measurements of multi-core fiber using OTDR," Optics Express, vol. 22, no. 24, pp. 30137-30147, 2014.

SUMMARY OF INVENTION

Technical Problem

The crosstalk is a parameter representing the degree of interference between cores. In addition, when light is input at one end of the non-coupled multicore fiber, the crosstalk is calculated by taking a ratio between cores for light intensity of each core of light output from the other end and expressing the ratio in logarithm. However, when two or more non-coupled multicore fibers are connected, the light intensity is changed, due to a cause other than the interference between the cores, by a connection loss or the like generated in the multicore fiber, and thus the crosstalk cannot be accurately calculated. Therefore, it is important to measure the connection loss.

Optical time domain reflectometry (OTDR) is widely used for measuring a loss distribution of an optical fiber. The OTDR can acquire a connection loss from a change in the OTDR waveform before and after the connection portion of the optical fiber. Non Patent Literature 1 discloses a method for measuring a multicore fiber using the OTDR.

On the other hand, when the core diameter and the relative refractive index difference between the multicore fibers to be connected are different, that is, when a backscattering coefficient is different for each multicore fiber to be connected, a correct connection loss cannot be obtained from the OTDR waveform measured from one end.

Non Patent Literature 2 discloses a method of separating a loss component and a component of a backscattering coefficient difference caused by a difference in fiber structure, by using OTDR waveforms measured from both ends of a multicore fiber transmission path.

However, considering a test in constructing an optical fiber transmission path, it is often difficult, in terms of operation, to perform a test from both ends of the transmission path, and there is a problem that a method for measuring a connection loss at a connection portion by a test from one end is necessary.

In addition, since the crosstalk is represented by the logarithm of the light intensity ratio between cores, even on condition that the connection loss for each core is unmeasurable, capability of measuring the difference between the cores of the connection loss at the connection portion is sufficient for calculation of the crosstalk. Therefore, in order to accurately calculate the crosstalk, a method of measuring a difference in connection loss between cores at the connection portion is necessary.

In order to solve the above problem, an object of the present disclosure is to measure a difference in connection loss between cores at a connection portion by measurement from only one end even on condition of connecting non-coupled multicore fibers having different backscattering coefficients.

Solution to Problem

In order to achieve the above object, a connection loss difference measuring method, an apparatus, and a program of the present disclosure each acquire OTDR waveforms by individually inputting light pulses to two cores at one end of a multicore fiber having a connection portion, and calculate an inter-core loss difference from backscattered light intensity ratios between cores, before and after the connection portion.

Specifically, a connection loss difference measuring method according to the present disclosure includes:

individually inputting light pulses to a first core and a second core at one end of a non-coupled multicore fiber having a connection portion, and individually acquiring OTDR waveforms regarding the first core and the second core;

calculating ratios between backscattering intensity regarding the first core and backscattering intensity regarding the second core, at at least two points including one point on one end side with respect to the connection portion and one point on another end side with respect to the connection portion, based on the acquired OTDR waveforms; and calculating a ratio between the calculated ratio on the one end side and the calculated ratio on the another end side.

Specifically, a connection loss difference measuring method according to the present disclosure includes:

individually inputting light pulses to a first core and a second core at one end of a non-coupled multicore fiber having a connection portion, and individually acquiring OTDR waveforms regarding the first core and the second core;

obtaining, for each core, a loss of backscattered light intensity, at the connection portion, based on the OTDR waveforms; and calculating a ratio between the loss of the first core and the loss of the second core.

For example, in the connection loss difference measuring method according to the present disclosure, Expression (C1) is used as backscattering intensity $P_m(z)$ regarding the first core at a distance z from the one end, and Expression (C2) is used as backscattering intensity $P_n(z)$ regarding the second core at the distance z,

[Math. C1]

$$P_m(z) = \begin{cases} P_{m0}\alpha_s(z)B(z)\exp(-2\alpha_m z) & (z \le z_1) \\ \eta_m P_{m0}\alpha_s(z)B(z)\exp(-2\alpha_m z) & (z \ge z_1) \end{cases} \quad (C1)$$

[Math. C2]

$$P_n(z) = \begin{cases} P_{n0}\alpha_s(z)B(z)\exp(-2\alpha_n z) & (z \le z_1) \\ \eta_n P_{n0}\alpha_s(z)B(z)\exp(-2\alpha_n z) & (z \ge z_1) \end{cases} \quad (C2)$$

Here, $z_1$ represents a distance from the one end to the connection portion, $P_{m0}$ represents intensity of the light pulse input to the first core, $P_{n0}$ represents intensity of the light pulse input to the second core, $\alpha_s$ represents a Rayleigh scattering coefficient, B represents a backscattered light capturing rate, $\alpha_m$ represents a fiber loss coefficient in the first core, $\alpha_n$ represents a fiber loss coefficient in the second core, $\eta_m$ represents connection efficiency in the first core, and $\eta_n$ represents connection efficiency in the second core.

Specifically, a connection loss difference measuring device according to the present disclosure includes:

an OTDR measurement unit that individually acquires OTDR waveforms regarding a first core and a second core at one end of a non-coupled multicore fiber having a connection portion;

an arithmetic processing unit that calculates ratios between backscattering intensity regarding the first core and backscattering intensity regarding the second core, at at least two points including one point on one end side with respect to the connection portion and one point on another end side with respect to the connection portion, based on the OTDR waveforms acquired by the OTDR measurement unit, and calculates a ratio between the calculated ratio on the one end side and the calculated ratio on the another end side.

Specifically, a connection loss difference measuring device according to the present disclosure includes:

an OTDR measurement unit that individually acquires OTDR waveforms regarding a first core and a second core at one end of a non-coupled multicore fiber having a connection portion; and an arithmetic processing unit that obtains, for each core, a loss of backscattered light intensity, at the connection portion, based on the OTDR waveforms, and calculates a ratio between the loss of the first core and the loss of the second core.

For example, in the connection loss difference measuring device according to the present disclosure, the arithmetic processing unit uses Expression (C3) as backscattering intensity $P_m(z)$ regarding the first core at a distance z from the one end, and uses Expression (C4) as backscattering intensity $P_n(z)$ regarding the second core at the distance z.

[Math. C3]

$$P_m(z) = \begin{cases} P_{m0}\alpha_s(z)B(z)\exp(-2\alpha_m z) & (z \le z_1) \\ \eta_m P_{m0}\alpha_s(z)B(z)\exp(-2\alpha_m z) & (z \ge z_1) \end{cases} \quad (C3)$$

[Math. C4]

$$P_n(z) = \begin{cases} P_{n0}\alpha_s(z)B(z)\exp(-2\alpha_n z) & (z \le z_1) \\ \eta_n P_{n0}\alpha_s(z)B(z)\exp(-2\alpha_n z) & (z \ge z_1) \end{cases} \quad (C4)$$

Here, $z_1$ represents a distance from the one end to the connection portion, $P_{m0}$ represents intensity of a light pulse input to the first core, $P_{n0}$ represents intensity of a light pulse input to the second core, $\alpha_s$ represents a Rayleigh scattering coefficient, B represents a backscattered light capturing rate, $\alpha_m$ represents a fiber loss coefficient in the first core, $\alpha_n$ represents a fiber loss coefficient in the second core, $\eta_m$ represents connection efficiency in the first core, and $\eta_n$ represents connection efficiency in the second core.

Specifically, the program according to the present disclosure instructs a computer to function as the arithmetic processing unit.

Note that the inventions described above can be combined in any possible manner.

Advantageous Effects of Invention

According to the present disclosure, even when non-coupled multicore fibers having different backscattering coefficients are connected, it is practical to measure a difference in connection loss between cores at a connection portion by measurement from only one end.

BRIEF DESCRIPTION OF DRAWINGS

FIG. 5 is a view illustrating a program according to the present disclosure.

DESCRIPTION OF EMBODIMENTS

Figure 1:
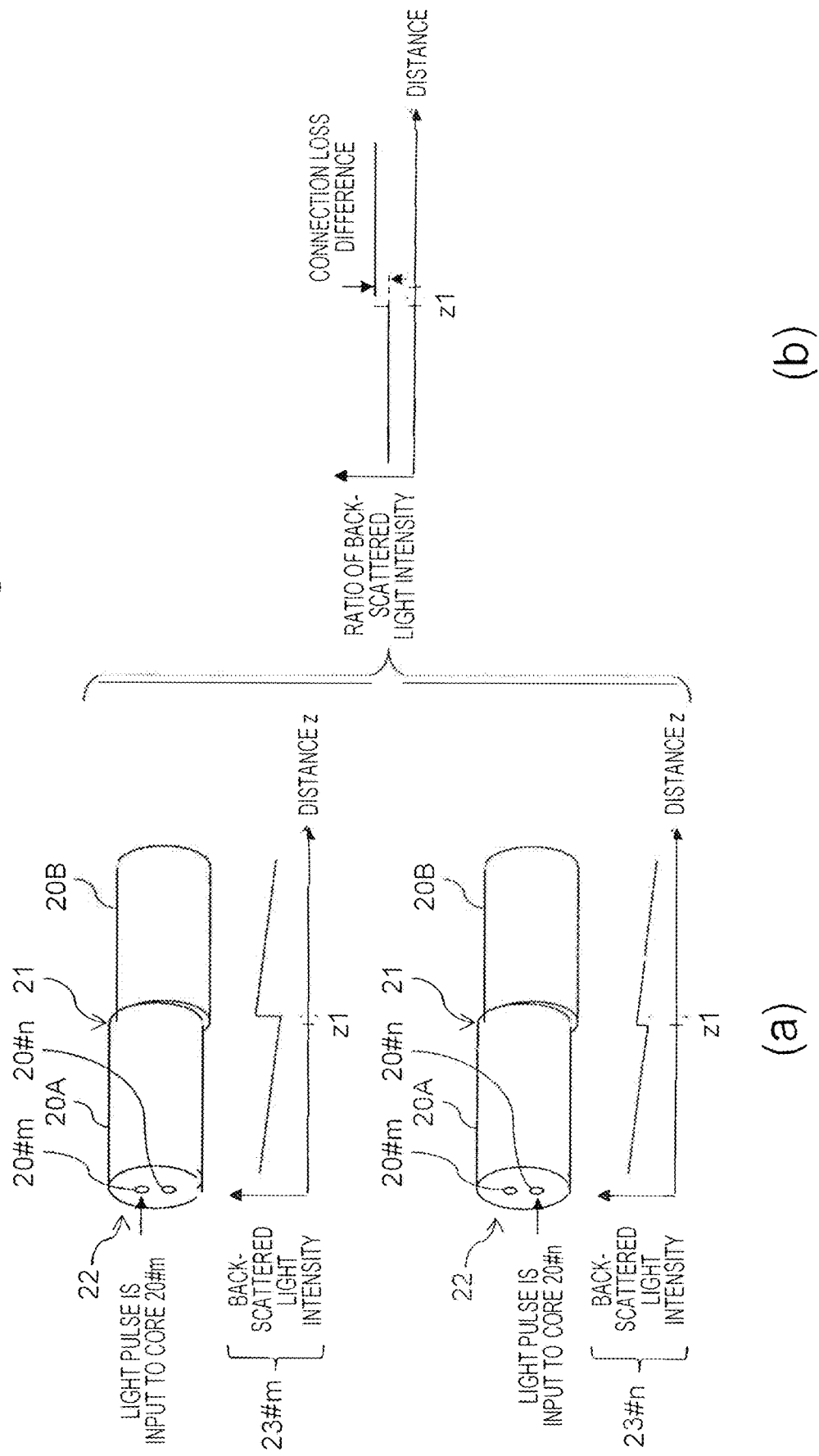
FIG. 1 is a diagram illustrating an optical fiber under test according to a first embodiment.

Hereinafter, embodiments of the present disclosure will be described in detail with reference to the drawings. Note that the present disclosure is not limited to the embodiments described below. These embodiments are merely examples, and the present disclosure can be carried out in forms with various modifications and improvements based on the knowledge of those skilled in the art. Note that components having the same reference numerals in the present specification and the drawings indicate the same components.

First Embodiment

An optical fiber under test 20 for being measured by a connection loss difference measuring device 10 according to the present embodiment will be described with reference to FIGS. 1(*a*) and 1(*b*). The optical fiber under test 20 is a non-coupled multicore fiber in which a non-coupled multicore fiber 20A and a non-coupled multicore fiber 20B are connected, and has a connection portion 21. Further, the optical fiber under test 20 has two or more cores. In the optical fiber under test 20 of FIG. 1(*a*), only a first core 20 #m and a second core 20 #n for being measured of the two or more cores of the optical fiber under test 20 are illustrated. Also in the following embodiments, the first core 20 #m and the second core 20 #n will be described. It is assumed that the connection portion 21 is at a distance z1 from one end 22 of the optical fiber under test 20 on the non-coupled multicore fiber 20A side. That is, in the optical fibers under test 20, a distance $z \leq z_1$ represents the non-coupled multicore fiber 20A, and $z \leq z_1$ represents the non-coupled multicore fiber 20B.

In the present embodiment, as will be described later, light pulses are individually input to the first core 20 #m and the second core 20 #n at one end 22 to acquire OTDR waveforms. In FIG. 1(*a*), 23 #m represents an example of an OTDR waveform regarding the first core 20 #m where a light pulse is input to the first core 20 #m at the one end 22, and 23 #n represents an example of an OTDR waveform regarding the second core 20 #n where a light pulse is input to the second core 20 #n at the one end 22. In addition, the OTDR waveforms 23 #m and 23 #n express backscattered light intensity distributions with respect to the distance z on a logarithmic scale. FIG. 1(*b*) illustrates the ratio between the backscattered light intensity distributions of the OTDR waveform 23 #m and the OTDR waveform 23 #n on the logarithmic scale.

In the OTDR waveforms 23 #m and 23 #n, the backscattered light intensity distributions regarding the first core 20 #m and the second core 20 #n are expressed by straight lines having the same inclination in the non-coupled multicore fiber 20A and the non-coupled multicore fiber 20B. Therefore, in the non-coupled multicore fiber 20A, the ratio of the backscattered light intensity distribution between the cores is constant. Also in the non-coupled multicore fiber 20B, the ratio of the backscattered light intensity distribution between the cores is constant.

On the other hand, in the OTDR waveforms 23 #m and 23 #n, at the distance z1 corresponding to the connection portion 21, the backscattered light intensity rapidly increases or decreases (increases in FIG. 1) in each of the first core 20 #m and the second core 20 #n. It is considered that the rapid increase or decrease in the backscattered light intensity is caused by a connection loss at the connection portion 21, a difference in the backscattering coefficient between the non-coupled multicore fiber 20A and the non-coupled multicore fiber 20B, or the like. In addition, the difference in the backscattering coefficient between the non-coupled multicore fiber 20A and the non-coupled multicore fiber 20B is common between the cores in many cases. In these cases, by taking the ratio of the backscattered light intensity distribution between the OTDR waveforms 23 #m and 23 #n, the difference between the cores of the connection loss at the connection portion 21 can be extracted as illustrated in FIG. 1(*b*). Hereinafter, a difference in connection loss between cores at the connection portion 21 as illustrated in FIG. 1(*b*) is referred to as a connection loss difference. As illustrated in FIG. 1, the present invention calculates the connection loss difference using the OTDR waveforms regarding the first core 20 #m and the second core 20 #n.

Figure 2:
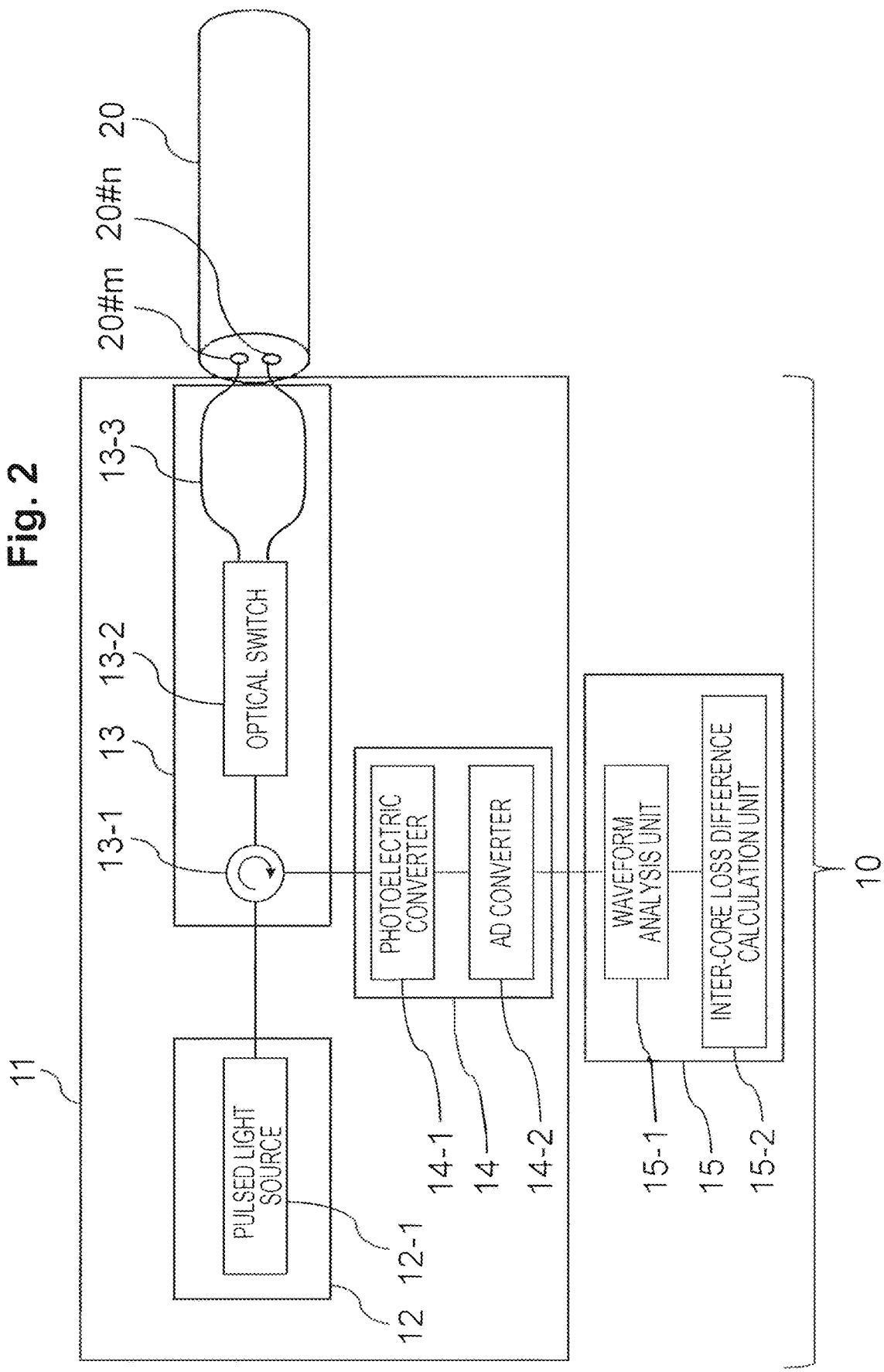
FIG. 2 illustrates an example of a schematic configuration of a connection loss difference measuring device according to the first embodiment.

FIG. 2 illustrates an example of a schematic configuration of the connection loss difference measuring device according to the present embodiment. The connection loss difference measuring device 10 according to the present embodiment includes an OTDR measurement unit 11 and an arithmetic processing unit 15.

The OTDR measurement unit 11 includes a test light generating unit 12, an input/output unit 13, and a reception unit 14. The OTDR measurement unit 11 acquires the OTDR waveforms regarding the first core 20 #m and the second core 20 #n from one end of the optical fiber under test 20.

The test light generating unit 12 generates a test light pulse. The test light generating unit 12 may have any configuration as long as it can generate and output the pulsed light, and for example, a pulsed light source 12-1 may be used.

The input/output unit 13 inputs the test light pulse from the test light generating unit 12 to the optical fiber under test 20 and outputs the backscattered light from the optical fiber under test 20 to the reception unit 14. The input/output unit 13 includes an optical circulator 13-1, an optical switch 13-2, and an input/output device 13-3.

The optical circulator 13-1 has three ports: as illustrated in FIG. 2, a first port connected to the test light generating unit 12, a second port connected to the optical switch 13-2, and a third port connected to the reception unit 14. The light input from the test light generating unit 12 connected to the first port is output to the optical switch 13-2 connected to the second port, and the light input from the optical switch 13-2 connected to the second port is output to the reception unit 14 connected to the third port.

The optical switch 13-2 switches the output destination of the light from the optical circulator 13-1 to the first core 20 #m or the second core 20 #n. Then, the optical switch 13-2 inputs the backscattered light, from the core that is the output destination, to the optical circulator 13-1.

The reception unit 14 measures the backscattered light intensity from the input/output unit 13. As illustrated in FIG. 2, the reception unit 14 includes a photoelectric converter 14-1 and an AD converter 14-2. The reception unit 14 converts the backscattered light from the input/output unit 13 into an analog signal representing the backscattered light intensity by the photoelectric converter 14-1, and further converts the analog signal into a digital signal by the AD converter 14-2.

The arithmetic processing unit 15 includes a waveform analysis unit 15-1 and a connection loss difference calculation unit 15-2. The waveform analysis unit 15-1 receives the digital signal from the reception unit 14. The waveform analysis unit 15-1 acquires an OTDR waveform from the received digital signal indicating the backscattered light intensity. Specifically, for each received digital signal, the waveform analysis unit 15-1 calculates, as a distance from one end of the optical fiber under test 20, a position on the optical fiber under test 20 where backscattered light has been generated, on the basis of the reception time. Then, the waveform analysis unit 15-1 acquires an OTDR waveform that is a backscattered light intensity distribution related to the distance from one end of the optical fiber under test 20.

On the basis of the OTDR waveform acquired by the waveform analysis unit 15-1, the connection loss difference calculation unit 15-2 calculates the ratios between the backscattered light intensity regarding the first core 20 #m and the backscattered light intensity regarding the second core 20 #n, at at least two points including one point on the one end side with respect to the connection portion 21 and one point on the other end side with respect to the connection portion, and calculates a ratio between the calculated ratio on the one end side and the ratio on the other end side. Note that a method of specifying the connection portion 21 may be specified from the OTDR waveform, or the distance z1 of the connection portion may be input to the connection loss difference calculation unit 15-2 in advance.

A connection loss difference measuring method performed by the connection loss difference measuring device 10 according to the present embodiment will be described. The connection loss difference measuring method according to the present embodiment includes steps S101, S102, and S103.

(Step S101)

The connection loss difference measuring device 10 inputs a light pulse from the test light generating unit 12 to the first core 20 #m via the optical switch 13-2, and acquires an OTDR waveform 23 #m of backscattered light regarding the first core 20 #m. In the present embodiment, an example of the backscattered light intensity distribution $P_m(z)$ regarding the first core 20 #m with respect to the distance z from the one end 22 obtained from the OTDR waveform 23 #m is expressed by Expression (1).

[Math. 1]

$$P_m(z) = \begin{cases} P_{m0}\alpha_s(z)B(z)\exp(-2\alpha_m z) & (z \leq z_1) \\ \eta_m P_{m0}\alpha_s(z)B(z)\exp(-2\alpha_m z) & (z \geq z_1) \end{cases} \quad (1)$$

Here, $P_{m0}$ represents intensity of the light pulse input to the first core 20 #m, $\alpha_s$ represents a Rayleigh scattering coefficient, B represents a backscattered light capturing rate, $\alpha_m$ represents a fiber loss coefficient in the first core 20 #m, and $\eta_m$ represents connection efficiency in the first core 20 #m.

The connection loss difference measuring device 10 inputs the light pulse from the test light generating unit 12 to the second core 20 #n via the optical switch 13-2, and acquires the OTDR waveform 23 #n of the backscattered light regarding the second core 20 #n. In the present embodiment, an example of the backscattered light intensity distribution $P_n(z)$ regarding the second core 20 #n with respect to the distance z from the one end 22 obtained from the OTDR waveform 23 #n is expressed by Expression (2).

[Math. 2]

$$P_n(z) = \begin{cases} P_{n0}\alpha_s(z)B(z)\exp(-2\alpha_n z) & (z \leq z_1) \\ \eta_n P_{n0}\alpha_s(z)B(z)\exp(-2\alpha_n z) & (z \geq z_1) \end{cases} \quad (2)$$

Here, $P_{n0}$ represents intensity of the light pulse input to the second core 20 #n, $\alpha_s$ represents a Rayleigh scattering coefficient, B represents a backscattered light capturing rate, $\alpha_n$ represents a fiber loss coefficient in the second core 20 #n, and $\eta_n$ represents connection efficiency in the second core 20 #n. $\alpha_s$ and B are the same as those of the first core 20 #m.

Note that, in this step according to the present embodiment, the OTDR waveforms are acquired in the order of the OTDR waveform 23 #m and the OTDR waveform 23 #n, but the order may be reversed.

(Step S102)

From the OTDR waveform 23 #m and the OTDR waveform 23 #n, the ratio of the backscattered light intensity between the first core 20 #m and the second core 20 #n is obtained at at least one point of $z \leq z_1$ on the one end 22 side with respect to the connection portion 21. Similarly, the ratio of the backscattered light intensity between the first core 20 #m and the second core 20 #n is also obtained at at least one point of $z \geq z_1$ on the other end side with respect to the connection portion 21. Note that, when the backscattered light intensity distribution is known as in Expressions (1) and (2), the ratios of the backscattered light intensity between the first core 20 #m and the second core 20 #n, at $z \leq z_1$ and $z \geq z_1$, may be individually obtained as in Expression (3) using the distributions of Expressions (1) and (2).

[Math. 3]

$$\frac{P_m(z)}{P_n(z)} = \begin{cases} \frac{P_{m0}}{P_{n0}}\exp[-2(\alpha_m - \alpha_n)z] & (z \leq z_1) \\ \frac{\eta_m}{\eta_n}\frac{P_{m0}}{P_{n0}}\exp[-2(\alpha_m - \alpha_n)z] & (z \geq z_1) \end{cases} \quad (3)$$

(Step S103)

A ratio between the ratio of the backscattered light intensity between the cores at $z \leq z_1$ and the ratio of the backscattered light intensity between the cores at $z \geq z_1$, which are obtained in step S102, is obtained. For example, when the backscattered light intensity distribution is known as in the expressions (1) and (2), the ratio between the first row and the second row on the right side of the expression (3) is taken. The result is expressed in Expression (4).

[Math. 4]

$$\frac{P_m(z|z \geq z_1)}{P_n(z|z \geq z_1)}\frac{P_n(z|z \leq z_1)}{P_m(z|z \leq z_1)} = \frac{\eta_m}{\eta_n} \quad (4)$$

Here, $P_m(z|z \geq z_1)$ represents $P_m(z)$ expressed by the expression in the second row of Expression (1), $P_m(z|z \leq z_1)$ represents $P_m(z)$ expressed by the expression in the first row of Expression (1), $P_n(z|z \geq z_1)$ represents $P_n(z)$ expressed by the expression in the second row of Expression (2), and $P_n(z|z \leq z_1)$ represents $P_n(z)$ expressed by the expression in the first row of Expression (2).

Then, the ratio obtained in this step is subjected to logarithmic conversion to obtain a connection loss difference.

Figure 3:
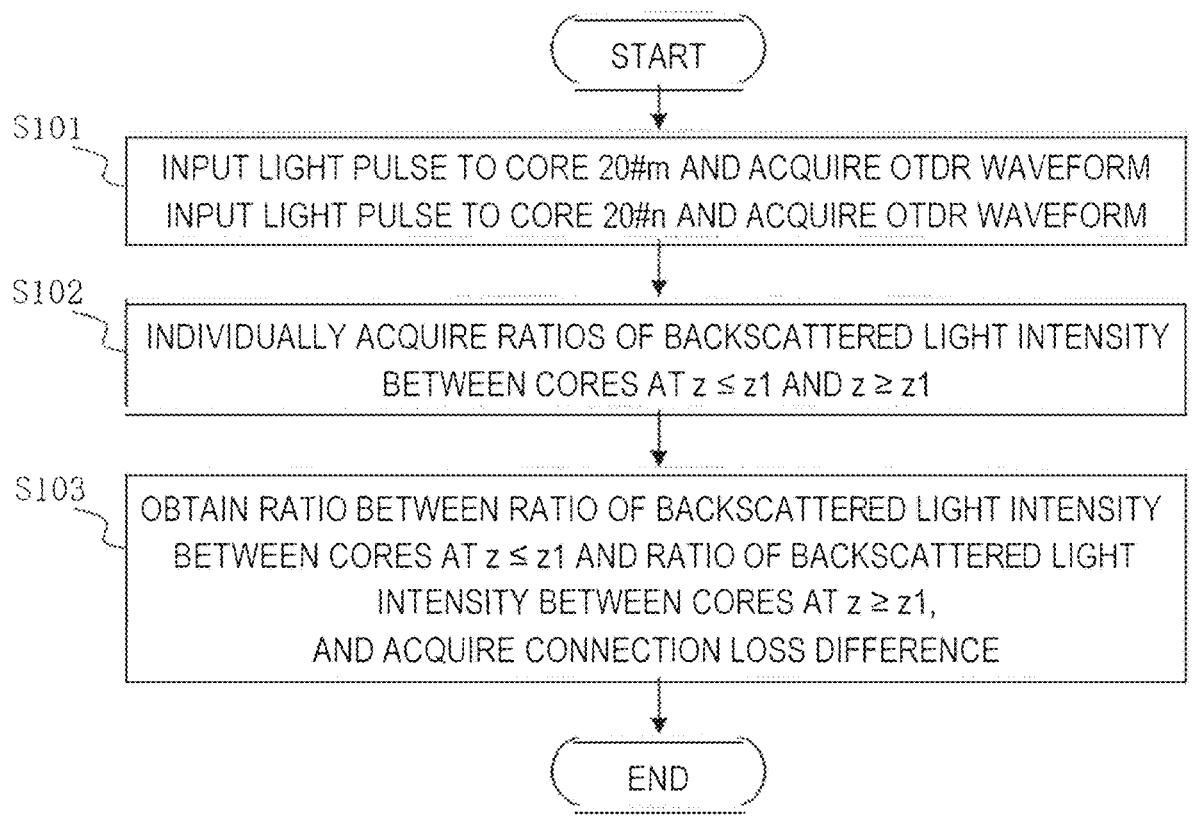
FIG. 3 illustrates an example of a procedure of a connection loss difference measuring method according to the first embodiment.
Figure 4:
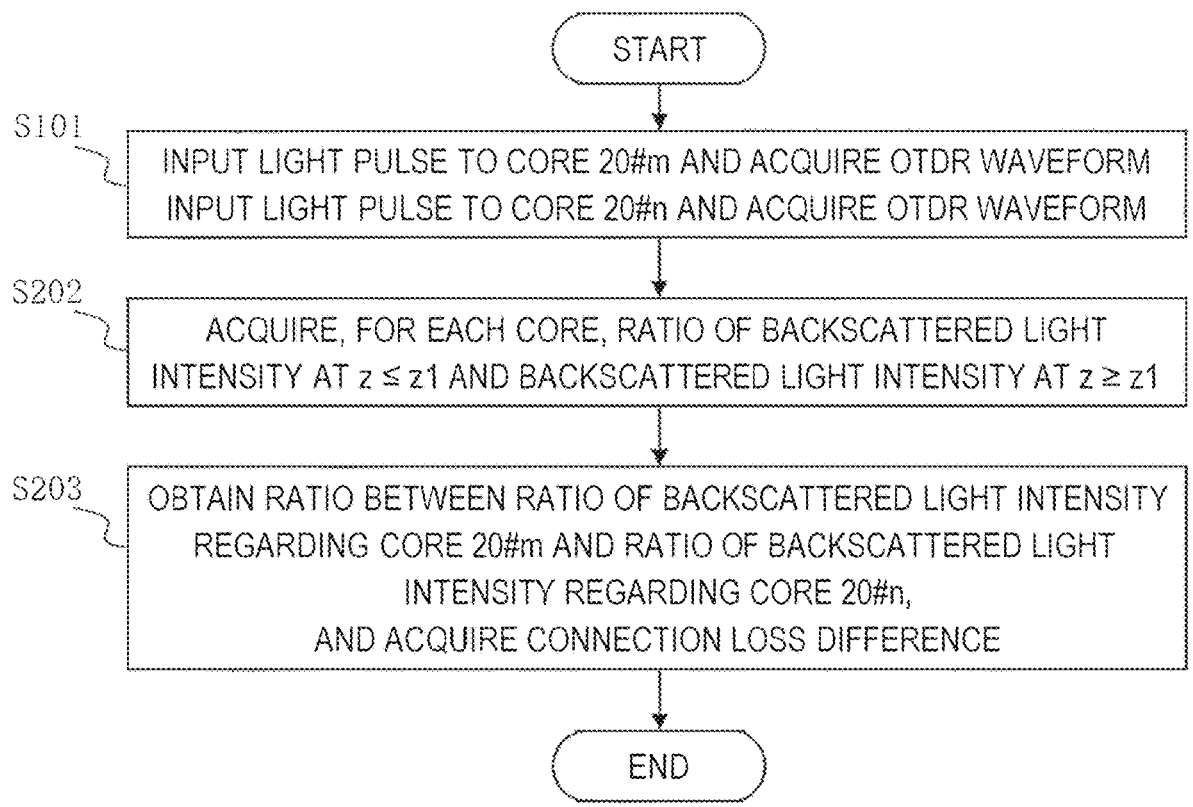
FIG. 4 illustrates an example of a procedure of the connection loss difference measuring method according to the first embodiment.

Further, FIG. 4 illustrates a procedure of a connection loss difference measuring method that substitutes for the connection loss difference measuring method illustrated in FIG. 3. In the procedure illustrated in FIG. 4, step S101 is the same as the procedure illustrated in FIG. 3, and steps S202 and S203 are performed instead of steps S102 and S103 in FIG. 3.

(Step S202)

From the OTDR waveform 23 #m, a ratio between the backscattered light intensity regarding the first core 20 #m at at least one point satisfying $z \leq z_1$ and the backscattered light intensity regarding the first core 20 #m at at least one point satisfying $z \geq z_1$ is obtained. When the backscattered light intensity distribution is known as in Expression (1), a ratio between the first row and the second row on the right side of Expression (1) may be used. As a result, the connection efficiency nm in the first core 20 #m is obtained.

Similarly, a ratio between the backscattered light intensity regarding the second core 20 #n at at least one point satisfying $z \leq z_1$ and the backscattered light intensity regarding the second core 20 #n at at least one point satisfying $z \geq z_1$ is obtained from the OTDR waveform 23 #n. When the backscattered light intensity distribution is known as in Expression (2), a ratio between the first row and the second row on the right side of Expression (2) may be used. Thus, the connection efficiency $\eta_n$ in the second core 20 #n is obtained.

(Step S203)

A ratio between the connection efficiency nm and the connection efficiency $\eta_n$, which are obtained in step S202, is obtained and subjected to logarithmic conversion to obtain a connection loss difference.

In addition, regarding the non-coupled multicore fiber 20A represented by $z \leq z_1$ and the non-coupled multicore fiber 20B represented by $z \geq z_1$ in the present embodiment, the Rayleigh scattering coefficient $\alpha_s$ and the backscattered light capturing rate B are common, but even when differences therein exist between the non-coupled multicore fiber 20A and the non-coupled multicore fiber 20B, a connection loss difference can be similarly obtained. Note that the product of the Rayleigh scattering coefficient $\alpha_s$ and the backscattered light capturing rate B is the backscattering coefficient.

As described above, according to the present invention, even when non-coupled multicore fibers having different backscattering coefficients are connected, it is practical to measure a difference in connection loss between cores at a connection portion by measurement from only one end.

Second Embodiment

The arithmetic processing unit 15 can also be implemented on a computer and in a program, and the program can be recorded in a recording medium or provided through a network.

FIG. 5 illustrates a block diagram of a system 100. The system 100 includes a computer 105 connected to a network 135.

The network 135 is a data communication network. The network 135 may be a private network or a public network, and may include any or all of (a) a personal area network, for example, covering a room, (b) a local area network, for example, covering a building, (c) a campus area network, for example, covering a campus, (d) a metropolitan area network, for example, covering a city, (e) a wide area network, for example, covering an area connected across boundaries of cities, rural areas, or countries, and (f) the Internet. Communication is performed by an electronic signal and an optical signal via the network 135.

The computer 105 includes a processor 110 and a memory 115 connected to the processor 110. The computer 105 is illustrated herein as a standalone device, but is not limited in this way, and rather may be connected to other devices (not illustrated) in a distributed processing system.

The processor 110 is an electronic device including logic circuitry that responds to and executes instructions.

The memory 115 is a tangible computer readable storage medium in which a computer program is encoded. In this regard, the memory 115 stores data and commands that are readable and executable by the processor 110 to control operation of the processor 110, namely program codes. The memory 115 can be implemented by a random access memory (RAM), a hard drive, a read-only memory (ROM), or a combination thereof. One of the components of the memory 115 is a program module 120.

The program module 120 includes instructions for controlling processor 110 to perform processes described herein. In the present specification, although it is described that operation is executed by the computer 105, a method, a process, or a sub-process thereof, the operation is actually executed by the processor 110.

The term "module" is used herein to refer to a functional operation that may be embodied either as a stand-alone component or as an integrated configuration of a plurality of sub-components. Thus, the program module 120 can be implemented as a single module or as a plurality of modules that operate in cooperation with each other. Furthermore, although the program module 120 is described herein as being installed in the memory 115 and thus implemented in software, the program module can be implemented in any of hardware (for example, an electronic circuit), firmware, software, or a combination thereof.

Although illustrated as already loaded into the memory 115, the program module 120 may be configured to be located on a storage device 140 so as to be subsequently loaded into the memory 115. The storage device 140 is a tangible computer-readable storage medium that stores the program module 120. Examples of the storage device 140 include a compact disk, a magnetic tape, a read-only memory, an optical storage medium, a hard drive or a memory unit including a plurality of parallel hard drives, and a universal serial bus (USB) flash drive. Alternatively, the storage device 140 may be a random access memory, or another type of electronic storage device located in a remote storage system (not illustrated) and connected to the computer 105 via the network 135.

The system 100 described herein further includes a data source 150A and a data source 150B, which are collectively referred to as a data source 150 and communicatively connected to the network 135. In practice, the data source 150 may include any number of data sources, that is, one or more data sources. Data sources 150 may include unstructured data and include social media.

The system 100 further includes a user device 130 operated by a user 101 and connected to the computer 105 via the network 135. Examples of the user device 130 include an input device, such as a keyboard or a voice recognition subsystem, for enabling the user 101 to input information and command selections to the processor 110. The user device 130 further includes an output device such as a display device, a printer, or a speech synthesizer. A cursor control unit, such as a mouse, trackball, or touch-sensitive screen, allows the user 101 to manipulate a cursor on the display device to communicate further information and command selections to the processor 110.

The processor 110 outputs a result 122 of execution of the program module 120 to the user device 130. Alternatively, the processor 110 may provide the output to a storage device 125, for example, a database or memory, or to a remote device, not illustrated, via the network 135.

For example, a program for acquiring the OTDR waveform on the basis of the measurement result of the backscattered light intensity and for performing steps S102 and S103 in FIG. 3 or steps S202 and S203 in FIG. 4 may be used as the program module 120. The system 100 can be operated as the arithmetic processing unit 15.

The term "include . . . " or "including." specifies that the mentioned features, integers, steps, or components are present, but should be understood as not excluding the presence of one or more other features, integers, steps, or components, or groups thereof. The terms "a" and "an" are indefinite articles for an object and therefore do not exclude embodiments having a plurality of objects.

Other Embodiments

Note that the present invention is not limited to the above embodiments, and various modifications can be made without departing from the gist of the present invention. In short, the present invention is not limited to the high-order embodiment as it is, and in the implementation stage, the constituent elements can be modified and embodied without departing from the gist thereof.

In addition, various inventions can be made by appropriately combining a plurality of constituent elements disclosed in the above embodiments. For example, some components may be deleted from all the components illustrated in the embodiments. Further, constituent elements in different embodiments may be appropriately combined.

INDUSTRIAL APPLICABILITY

The connection loss difference measuring method, the device, and the program according to the present disclosure can be applied to the information communication industry.

REFERENCE SIGNS LIST

10 Connection loss difference measuring device
11 OTDR measurement unit
12 Test light generating unit
12-1 Pulsed light source
13 Input/output unit
13-1 Optical circulator
13-2 Optical switch
13-3 Input/output device
14 Reception unit
14-1 Photoelectric converter
14-2 AD converter
15 Arithmetic processing unit
15-1 Waveform analysis unit
15-2 Connection loss difference calculation unit
20 Optical fiber under test
20A, 20B Non-coupled multicore fiber
20 #m First core
20 #n Second core
21 Connection portion
22 One end
23 OTDR waveform
100 System
101 User
105 Computer
110 Processor
115 Memory
120 Program module
122 Result
125 Storage device
130 User device
135 Network
140 Storage device
150 Data source

The invention claimed is:

1. A connection loss difference measuring method, comprising:
individually inputting light pulses to a first core and a second core at one end of a non-coupled multicore fiber having a connection portion, and individually acquiring OTDR waveforms regarding the first core and the second core;
calculating ratios between backscattering intensity regarding the first core and backscattering intensity regarding the second core, at at least two points including one point on one end side with respect to the connection portion and one point on another end side with respect to the connection portion, based on the acquired OTDR waveforms; and
calculating a ratio between the calculated ratio on the one end side and the calculated ratio on the another end side.

2. The connection loss difference measuring method according to claim 1, wherein
Expression (C1) is used as backscattering intensity $P_m(z)$ regarding the first core at a distance z from the one end, and Expression (C2) is used as backscattering intensity $P_n(z)$ regarding the second core at the distance z,

[Math. C1]
$$P_m(z) = \begin{cases} P_{m0}\alpha_s(z)B(z)\exp(-2\alpha_m z) & (z \leq z_1) \\ \eta_m P_{m0}\alpha_s(z)B(z)\exp(-2\alpha_m z) & (z \geq z_1) \end{cases} \quad (C1)$$

[Math. C2]
$$P_n(z) = \begin{cases} P_{n0}\alpha_s(z)B(z)\exp(-2\alpha_n z) & (z \leq z_1) \\ \eta_n P_{n0}\alpha_s(z)B(z)\exp(-2\alpha_n z) & (z \geq z_1) \end{cases} \quad (C2)$$

where $z_1$ represents a distance from the one end to the connection portion, $P_{m0}$ represents intensity of the light pulse input to the first core, $P_{n0}$ represents intensity of the light pulse input to the second core, as represents a Rayleigh scattering coefficient, B represents a backscattered light capturing rate, $\alpha_m$ represents a fiber loss coefficient in the first core, $\alpha_n$ represents a fiber loss coefficient in the second core, $\eta_m$ represents connection efficiency in the first core, and In represents connection efficiency in the second core.

3. A connection loss difference measuring method, comprising:
individually inputting light pulses to a first core and a second core at one end of a non-coupled multicore fiber having a connection portion, and individually acquiring OTDR waveforms regarding the first core and the second core;
obtaining, for each core, a loss of backscattered light intensity, at the connection portion, based on the OTDR waveforms; and
calculating a ratio between the loss of the first core and the loss of the second core.

4. A connection loss difference measuring device, comprising:
an optical time domain reflectometer that individually acquires OTDR waveforms regarding a first core and a second core at one end of a non-coupled multicore fiber having a connection portion;
a processor; and
a storage medium having computer program instructions stored thereon, when executed by the processor, perform to:
calculate ratios between backscattering intensity regarding the first core and backscattering intensity regarding the second core, at at least two points including one point on one end side with respect to the connection portion and one point on another end side with respect to the connection portion, based on the OTDR waveforms, and calculate a ratio between the calculated ratio on the one end side and the calculated ratio on the another end side.

5. The connection loss difference measuring device according to claim 4, wherein the computer program instructions further perform to use Expression (C3) as backscattering intensity $P_m(z)$ regarding the first core at a distance z from the one end, and use Expression (C4) as backscattering intensity $P_n(z)$ regarding the second core at the distance z,

[Math. C3]

$$P_m(z) = \begin{cases} P_{m0}\alpha_s(z)B(z)\exp(-2\alpha_m z) & (z \leq z_1) \\ \eta_m P_{m0}\alpha_s(z)B(z)\exp(-2\alpha_m z) & (z \geq z_1) \end{cases} \quad (C3)$$

[Math. C4]

$$P_n(z) = \begin{cases} P_{n0}\alpha_s(z)B(z)\exp(-2\alpha_n z) & (z \leq z_1) \\ \eta_n P_{n0}\alpha_s(z)B(z)\exp(-2\alpha_n z) & (z \geq z_1) \end{cases} \quad (C4)$$

where $z_1$ represents a distance from the one end to the connection portion, $P_{m0}$ represents intensity of a light pulse input to the first core, $P_{n0}$ represents intensity of a light pulse input to the second core, $\alpha_s$ represents a Rayleigh scattering coefficient, B represents a backscattered light capturing rate, $\alpha_m$ represents a fiber loss coefficient in the first core, $\alpha_n$ represents a fiber loss coefficient in the second core, $\eta_m$ represents connection efficiency in the first core, and In represents connection efficiency in the second core.

6. A connection loss difference measuring device, comprising:

an optical time domain reflectometer that individually acquires OTDR waveforms regarding a first core and a second core at one end of a non-coupled multicore fiber having a connection portion;

a processor; and a storage medium having computer program instructions stored thereon, when executed by the processor, perform to:

obtain, for each core, a loss of backscattered light intensity, at the connection portion, based on the OTDR waveforms, and calculate a ratio between the loss of the first core and the loss of the second core.

* * * * *